(12) United States Patent
Tovander

(10) Patent No.: US 6,507,649 B1
(45) Date of Patent: Jan. 14, 2003

(54) MECHANISM AND METHOD FOR DISTRIBUTING ISUP STACKS OVER MULTIPLE LOOSELY COUPLED PROCESSORS

(75) Inventor: Lars A. Tovander, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/216,079

(22) Filed: Dec. 18, 1998

(51) Int. Cl.[7] .......................... H04M 7/00; H04L 12/28; H04J 3/16
(52) U.S. Cl. ................. 379/230; 379/221.08; 370/410; 370/469
(58) Field of Search ................. 379/229, 230, 379/219, 220.01, 221.01–221.12, 207.02; 370/228, 410, 426, 467, 469, 401, 352–356

(56) References Cited

U.S. PATENT DOCUMENTS

| | | | | |
|---|---|---|---|---|
| 5,182,744 A | * | 1/1993 | Askew et al. ................ 370/228 |
| 5,966,431 A | * | 10/1999 | Reiman et al. ........ 379/115.01 |
| 6,011,803 A | * | 1/2000 | Bicknell et al. ............. 370/467 |
| 6,167,129 A | * | 12/2000 | Fikis et al. .................. 370/426 |
| 6,175,618 B1 | * | 1/2001 | Shah et al. ............. 379/207.13 |
| 6,181,703 B1 | * | 1/2001 | Christie et al. ............. 370/410 |
| 6,226,373 B1 | * | 5/2001 | Zhu et al. .............. 379/207.02 |
| 6,324,183 B1 | * | 11/2001 | Miller et al. ................. 370/467 |
| 2001/0002194 A1 | * | 5/2001 | Rose |

FOREIGN PATENT DOCUMENTS

| EP | 0 851 653 A2 | 7/1998 |
|---|---|---|
| EP | 0 853 411 A2 | 7/1998 |

* cited by examiner

*Primary Examiner*—Benny Q. Tieu

(57) ABSTRACT

A thin ISUP layer (100) for internetworking an SS7 gateway and distributed ISUPs (90) residing on separate processors suitable for use in an SS7 network (50). The thin-ISUP layer (100) defines an operations/management module that controls circuit signaling functions between an SS7 gateway and the distributed ISUPs (90). A set of ISUP messaging functions are provided to control the sequencing of messages for distribution among the processors. Connection supervision is provided to maintain the connections between the processors. The thin ISUP layer (100) can be implemented between the MPT layer (84, 86, 88) and an ISUP layer (90) of distributed processors in the network (50).

24 Claims, 7 Drawing Sheets

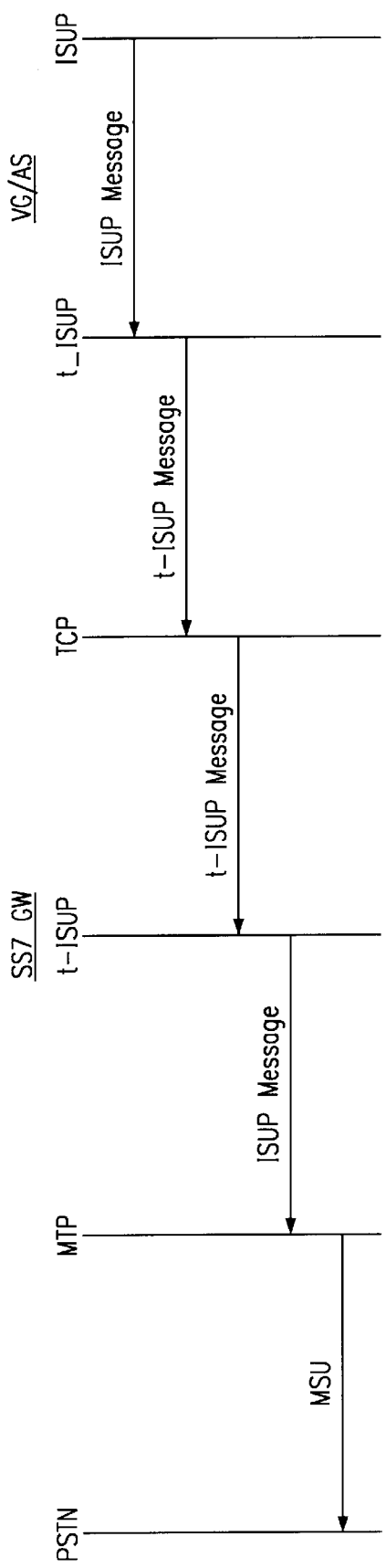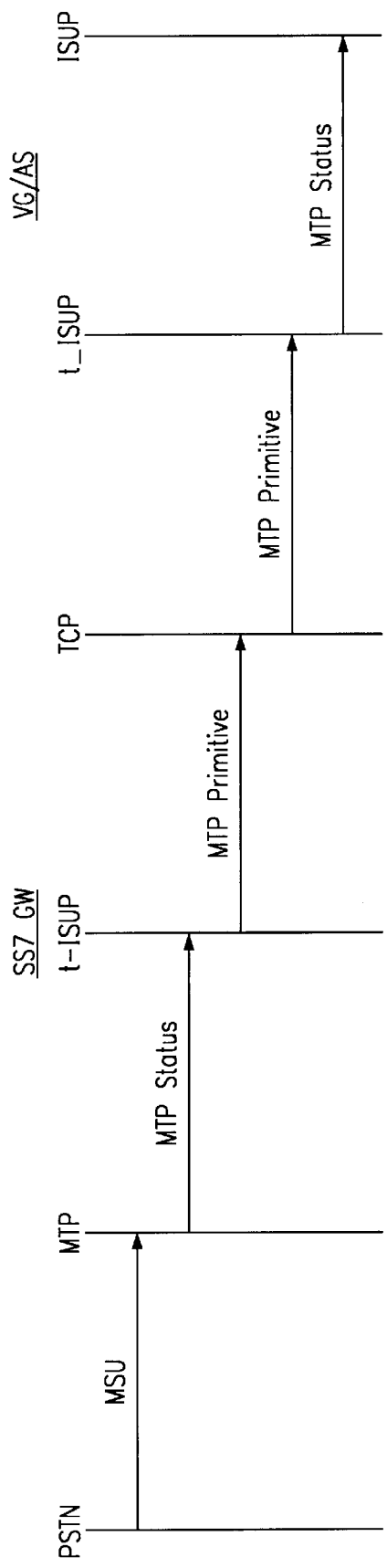
FIG. 6
FIG. 7

MECHANISM AND METHOD FOR DISTRIBUTING ISUP STACKS OVER MULTIPLE LOOSELY COUPLED PROCESSORS

TECHNICAL FIELD

The present invention relates generally to Internet Protocol (IP) telephony including voice over IP and more specifically to IP telephony applications that terminate with ISUP signaling.

BACKGROUND OF THE INVENTION

Common channel signaling system number 7 (SS7 or C7) is a global standard for telecommunications defined by the International Telecommunication Union (ITU) and specifically the Telecommunications Standardization Section of the ITU (ITU-T). In essence, the SS7 standard defines the procedures and protocols by which network elements in the public switch telephone network (PSTN) exchange information over a digital signaling network including wireless, e.g. cellular, and wireline call setup, routing and control. The ITU definition of SS7 allows for variance of the procedures and protocols such as those promulgated by the American National Standards Institute (ANSI) and Bell Communications Research (Bellcore) standards used in North America as well as the European Telecommunication Standards Institute (ETSI) standards used in Europe.

Essentially, an SS7 network and the defined protocols are used for implementing call signaling functions including basic call setup management and tear down. In addition, SS7 specifies various wireless services such as personal communication services (PCS), wireless roaming and mobile subscription authentication. Most recently, the SS7 protocol has been used for local number portability (LNP) as well as toll free and toll wireline services. Other services that benefit from the SS7 protocol include enhanced called features such as call forwarding, calling party name and number display and three way calling as well as a wide array of emerging applications standards that provide for efficient and secure worldwide telecommunication.

With an SS7 network, messages are exchanged between network elements over 56 or 64 kilobits per second (kbps) using bi-directional channels called signaling links. Signaling occurs-out-of-band on dedicated channels rather than in-band on voice channels. Compared to in-band signaling, out-of-band signaling provides faster call setup times, more efficient use of voice circuits, and support for intelligent network services which require signaling to network elements without voice trunks. In addition, out-of-band provides for improved control over fraudulent network use. These advantages have made the SS7 protocol a popular choice for voice over Internet Protocol (IP) applications including IP telephony.

The hardware and software functions of the SS7 protocol are divided into functional abstractions called levels. These levels map loosely to the Open Systems Interconnect (OSI) 7-layer model defined by the International Standards Organization (ISO). An ISDN user part (ISUP) defines the protocol used to setup, manage and release trunk circuits that carry voice data between terminating line exchanges, e.g., between a calling party and a called party. In general, ISUP is used for both Integrated Systems Digital Services (ISDN) and non-ISDN calls. However, calls that originate and terminate at the same switch do not use ISUP signaling.

The layers that are used to implement the ISUP stack may be distributed among multiple processors in an SS7 network in order to accomplish the message signaling functions specified in a particular ISUP protocol. For example, a signaling link may need to be allocated based on availability of the element in the PSTN portion of the network or in the SS7 gateway node. Likewise, other setup management and signaling functions may be implemented by the assistance of distributed elements and layered functions within the network.

A technical challenge that exists when ISUP stacks are distributed between multiple processors is the routing of messages to the proper processor and the handling of circuit connections. Present ISUP stack implementations require a dedicated processor from a single vendor or one that has been adapted using fixed signaling protocols that are not easily open to reconfiguration. Thus, an SS7 protocol stack may not support the interface between one layer in a stack and another layer if the interfaces belong to different vendor equipment. The end result may be difficult or impossible integration of network equipment from different vendors into a single network architecture. While distributed ISUP processing is used and available today, only proprietary systems with products from a single vendor or products that have been adapted to be used within a single system are employed.

SUMMARY OF THE INVENTION

The present invention provides a mechanism in the form of a thin layer within the SS7 protocol stack that makes it possible for ISUP stacks running on distributed processors to run independently without knowledge regarding its distribution. In this way, any adaptation in the signaling between a message transfer part (MTP) node and an ISUP node can be handled within the added layer. The mechanism permits different vendor elements to use ISUP stacks from different vendors.

According to one embodiment, disclosed is a mechanism for distributing end-to-end call setup and signaling functions among multiple processors in a common channel signaling system. The mechanism includes an array of loosely coupled processors that communicate with each other over connections using a standardized protocol such as the Internet Protocol (IP). A task distribution module is operably coupled to the array and configured to administer failure recovery functions when one of the connections or processors fail. The connections can be configured to provide signaling links for carrying voice data and in one embodiment support signaling system number 7 (SS7).

The task distribution function can be implemented between the MTP layer 3 and the ISUP layer of a SS7 signaling link. In this way some of the processors can be functionally organized as a SS7 gateway while some other processors can be functionally organized as a voice gateway or access server which communicates with the SS7 gateway through a TCP/IP connection.

Further disclosed is a mechanism for internetworking an SS7 gateway and distributed ISUPs residing on separate processors in an Internet Protocol telephony signaling network utilizing common channel signaling system number 7 (SS7). The mechanism includes an operations management module configured to control circuit signaling functions between the SS7 gateway and the distributed ISUPs. A plurality of ISUP messaging functions are implemented in hardware and control the format of both single circuit and group messages distributed between the SS7 processors. The mechanism also includes a connection supervision module that maintains connections between any of the separate processors and is configured so that the operations management module, ISUP messaging functions and connection supervision module together form a protocol stack layer interspersed between the MTP layer 3 and the ISUP layer of the network. The mechanism can include a public switch telephone network coupled to the SS7 gateway through an SS7 signaling link. In one embodiment, the ISUPs include a voice gateway coupled to the SS7 gateway through a TCP/IP communications link. Speech connection channels can be used to couple the voice gateways to the PSTN.

BRIEF DESCRIPTION OF THE DRAWINGS

Other aspects of the invention including specific embodiments are understood by reference to the following detailed description taken in conjunction with the intended drawings in which

FIGS. 5–12 illustrate sample sequences for an SS7 gateway internetworking function defined by the thin ISUP layer of the present invention.

References in the detailed description correspond to like references in the figures unless otherwise noted.

DETAILED DESCRIPTION OF PREFERRED EMBODIMENTS

Figure 1:
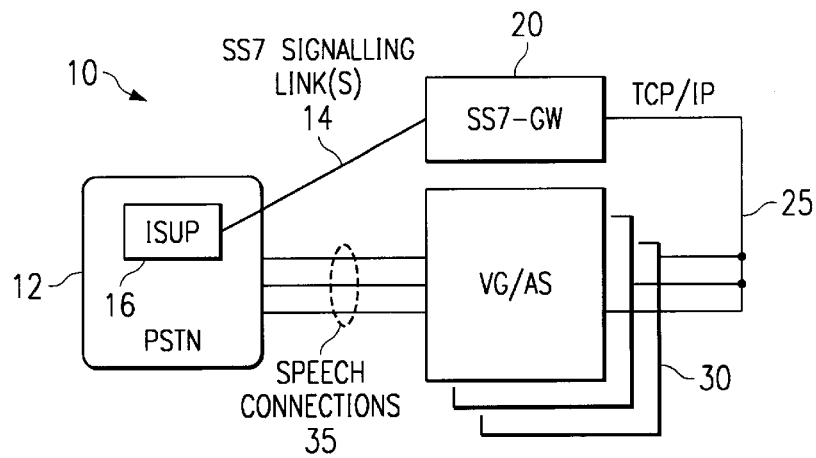
FIG. 1 illustrates a node in an SS7 network utilizing the thin ISUP layer of the invention according to one embodiment.

The invention has application in a processing environment where protocol stacks may be distributed through layered functions or where a higher layer in a stack needs to be distributed over multiple processors. With reference to FIG. 1, therein is shown a general architecture of a common channel Signaling System Number 7 (SS7) network 10. The network architecture 10 includes a public switch telephone network (PSTN) 12 which includes all of the various communications facilities designed for operation over twisted pair wiring within the voice band. Examples of such communications equipment include the plain old telephone system (POTS), facsimile machines, analog modems, ISDN compatible devices and other similar components well known to those familiar with PSTN installations.

The PSTN 12 is coupled to an SS7 gateway 20 through a signaling channel 14. Preferably the signaling channel 14 is an SS7 signaling link which supports basic call setup management and tear down procedures between the PSTN 12 and the SS7 gateway 20. If so, the SS7 signaling link 14 is a bi-directional channel that provides out-of-band signaling between the PSTN 12 (through the ISUP gateway 16) and the SS7 gateway 20. The SS7 protocol provides a means of internetworking the PSTN 12 with the SS7 gateway 20.

Also shown, is an array of voice gateways or access servers (VG/AS array) 30 coupled to the SS7 gateway 20 through a number of TCP/IP connections 25. In one embodiment the TCP/IP connections 25 between the SS7 gateway 20 and the VG/AS array 30 are static connections with one connection per VG/AS element in the array 30. Typically, each one of the individual elements in the array VG/AS 30 implements an ISUP layer of the SS7 protocol stack. The individual nodes of the VG/AS array 30 are coupled to the PSTN 12 through speech connections 35 which provide transmission pathways for digital speech data in IP telephony applications.

Figure 2:
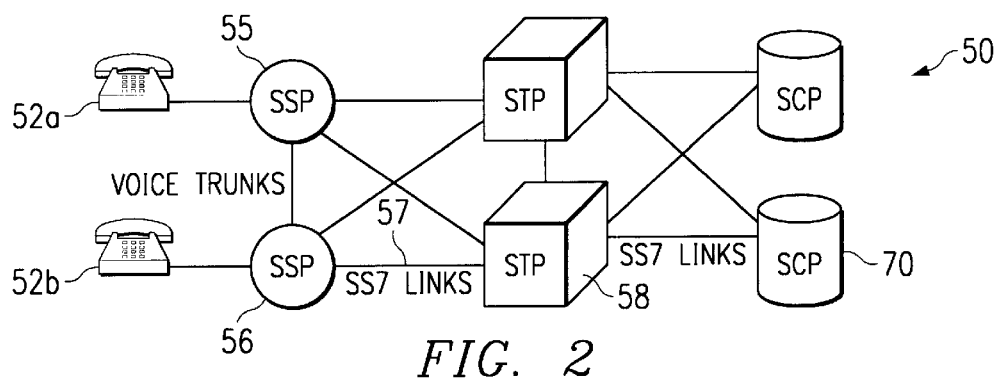
FIG. 2 illustrates the arrangements of signaling points within an SS7 network.

FIG. 2 is a model of a typical SS7 network, denoted generally as 50, comprising a plurality of signaling links and signaling points. Specifically, POTS 52a, 52b are coupled to corresponding service switch points (SSP) 55 and 56. Like other signaling points within the network 50, the SSPs 55 and 56 are uniquely identified by a numeric point code. Numeric point codes are carried in signaling messages exchanged between signaling points to identify the source and destination of each message. Each signaling point uses a routing table to select the appropriate signaling path for each message.

The SSPs 55, 56 are switches that originally terminate as tandem calls. An individual SSP sends signaling messages to other SSPs required to setup, manage and release voice circuits required to complete a call. An SSP may also send a query message to a centralized data base such as the Service Control Point (SCP) 70 to determine how to route a call, e.g., a toll free number calling North America. The SCP 70 sends a response to the originating SSP 56, for example, containing the routing numbers associated with a dialed number. An alternate routing number may be used by the SSP 56 if the primary number is busy or the call is unanswered within a specified time. Actual call features vary from network to network and from service to service.

Network traffic between signaling points may be routed via package switch called a signal transfer point (STP) 58. The SSP 56 is coupled to the STP 58 through one or more SS7 links 57. An operation of the STP 58 routes each incoming message to an ongoing signaling link based on routing information contained in the SS7 message. Because the STP 58 acts as a network hub, the STP 58 provides improved utilization of the SS7 network 50 by eliminating the need for direct links between signaling points. An STP 58 may perform global title translation, a procedure by which destination signaling point is determined from digits present in the signaling message. Likewise, the STP 58 can act as a fire wall to screen SS7 messages exchanged with other networks.

Because the SS7 network 50 is critical to call processing, the STP 56 and STP 58 are usually deployed in mated pair configurations as shown in FIG. 2. Typically, pairs of elements are located in separate physical locations to assure network wide service in the event of an isolated failure. The links 57 between signaling points 56, 58 can also be provisioned in pairs. Traffic is shared across all links in the link set and if one of the links fails the signaling traffic is rerouted over another link in the link set. The SS7 protocol provides both error correction and retransmission capabilities to allow continued service in the event of signaling point or link failures.

Figure 3:
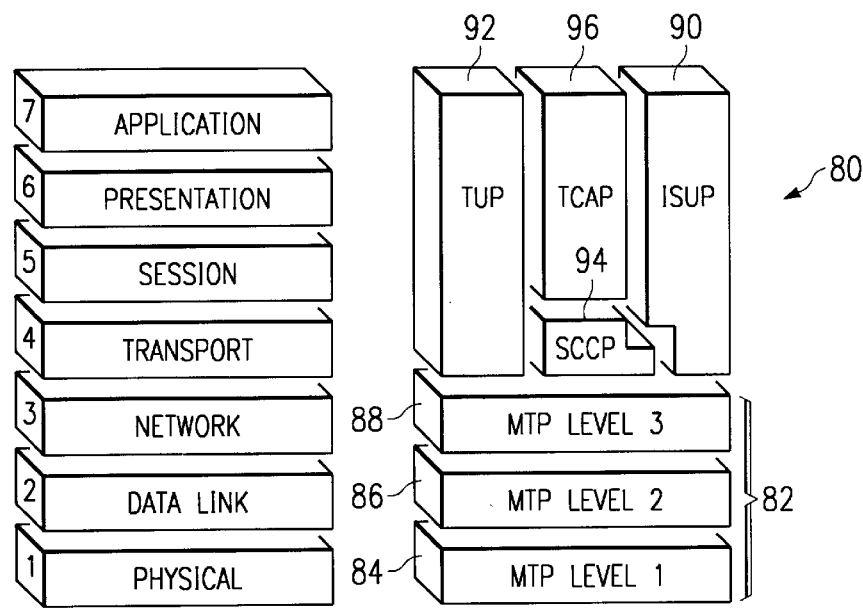
FIG. 3 illustrates an SS7 protocol stack along side the OSI reference model.

With reference to FIG. 3 therein is shown the SSS protocol stack 80 aside the OSI reference model. The message transfer part (MTP) layer 82 is divided into three levels. The lowest level, MTP level one 84 is equivalent to the OSI physical layer. MTP level one 84 defines the physical, electrical and functional characteristics of the digital signaling link.

Next, MTP level two 86 ensures accurate end-to-end transmission of a message across a signaling link. In essence, the MTP level two 86 implements flow control, message sequence validation and error checking so that when an error occurs on a signaling link, the message (or set of messages) is retransmitted. As indicated in FIG. 3 the MTP level two 86 is equivalent to the OSI data link layer.

The final layer of MTP 82, MTP level three 88 provides message routing between signaling points in the SS7 network. MTP level three 88 reroutes traffic away from failed links and controls traffic when congestion occurs. MTP level three 88 functions as the OSI network layer of the OSI reference model.

The ISUP layer 90 of the SS7 protocol stack 80 defines the protocol used to setup, manage and release trunk circuits that carry voice and data between terminating line exchanges, e.g., between a calling party and a called party. The ISUP layer 90 is used for both ISDN and non-ISDN calls. However, calls that are originate and terminate at the same switch do not use ISUP signaling.

The protocol stack 80 also includes a telephone user part (TUP) layer 92 which supports basic call setup and pair down functions in some parts of the world. The TUP layer 92 handles analog circuits only and in some countries, the ISUP layer 90 has been used to replace TUP layer 92 for call management.

A signal link connection control part (SCCP) 94 provides connection-less and connection-oriented network services and global title translation capabilities above the MTP level three 88. A global title is an address, e.g., a dialed 800 number, calling card number, or mobile subscriber identification number, which is translated by the SCCP layer 94 into a destination point code (DPC) and subsystem number. A subsystem number uniquely identifies an application at the base destination signaling point. The SCCP layer 94 is used as a transport layer for TCAP based services.

The final part of the SS7 protocol stack 80 includes the transaction capabilities application part (TCAP) 96 which supports the exchange of noncircuit related data between applications across the SS7 network 50 and the SCCP 94 connectionless service. As such, queries and responses send between the SSP 56 and the SCP 70 are carried in a TCAP message. For example, an SSP 56 sends a TCAP query to determine the routing number associated with the dialed number and to check the personal identification number of a calling card user. In mobile networks (IS-41 and GSM), TCAP 96 carries mobile application part messages sent between mobile switches and data bases to support user authentication equipment identification and roaming.

The protocol stack 80 is a broad standard for telecommunications internetworking that can support a wide array of telecommunications equipment and components. Where the ISUP protocol stack 80 is implemented across a wide and distributed set of processing platforms, it is often required that the equipment be from a single vendor or that modifications be made to the equipment in order to support the specific SS7 protocol stack implementation. Such requirements limit the internetworking possibilities of an SS7 network and make equipment integration difficult and costly.

Figure 4:
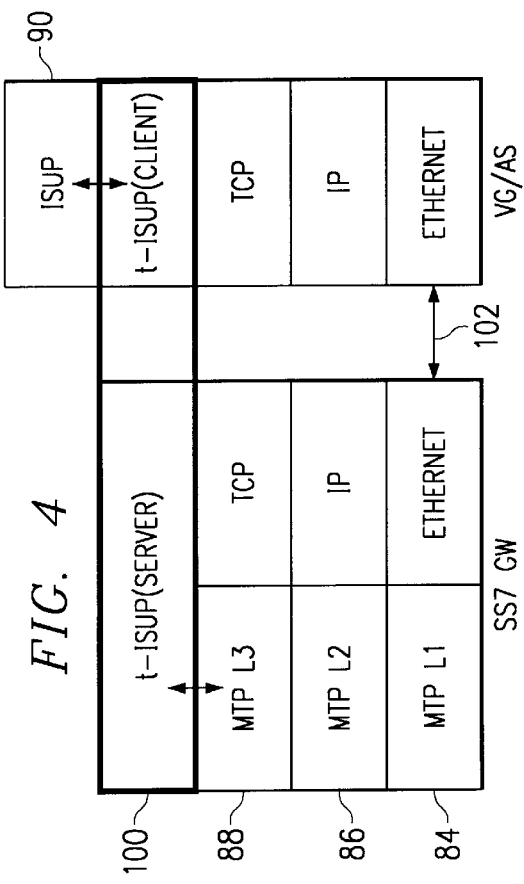
FIG. 4 shows the arrangement of the thin ISUP layer within the MTP and ISUP nodes in an SS7 gateway protocol stack.

Turning now to FIG. 4, therein is shown the mechanism for distributing an ISUP stack 80 between multiple processors through the use of a thin-ISUP layer 100. The thin ISUP layer 100 provides a mechanism for distributing messages to a proper processor within a node or an IP network. In addition, the thin ISUP stack 50 is configured to implement shut-down and recovery procedures necessary if a processor or connection fails.

As shown, the thin ISUP layer 100 sits between the MTP layer three 88 and the ISUP layer 90. The thin ISUP layer 100 provides a communications interface which can handle adaptations in the MTP signaling node and an ISUP node in the network 50. For example, in FIG. 4, the MTP node comprises an SS7 gateway (SS7 GW) while the ISUP node is implemented in a voice gateway or access server (VG/AS). A connection 102 between the SS7 GW and the VG/AS is provided. In one embodiment the connection 102 is a static connection meaning that a single connection for gateway and destination point (DPC). The DPC is used in SS7 networks to identify signaling nodes.

The thin ISUP layer 100 can be used in conjunction with a set of procedures which define the way messages are transmitted between different nodes of the SS7 network 50 and allows supervision of connections between any two nodes as well as recovery procedures when a connection is lost. In one embodiment, the following procedures are included in an operations/management module of the ISUP layer 100:

Operations/Management Module
HeartBeat

In order to indicate that an entity is 'alive' HeartBeat message is sent every X seconds. If more than Y HeartBeats are missed, the receiver assumes that the sender is dead. Any other message should also reset the HeartBeat timing.

Circuit Control

The SS7 GW will initiate the status for each circuit to Unknown. The VG/AS will, when needed, update the status in the SS7 GW and hand over the control of the circuits with Control_Req/Ack.

The VG/AS can resume control of the circuits, and get information regarding the status with the Contro_Resume_Req/Ack.

The control messages are used to avoid having the SS7 GW send blocking messages at loss of connection to the VG/AS, when the blocking has already been performed.

It is envisioned that a set of MTP primitives can be used to handle flow control between the SS7 GW and the VG/AS. When the thin ISUP layer 100 receives an MTP status indication, it will distribute the corresponding thin ISUP layer MTP-Primitive message to all VG/AS that are connected to the indicated DPC.

If a message is requested to be sent with a priority lower than the current congestion level, the SS7 GW will return Message_Not_Sent to the VG/AS.

If the thin ISUP layer 100 receives an indication to start/stop flow control, the MTP Primitive MTP_Flow_Control is sent towards the SS7 GW. If the action is Start flow control, the SS7 GW will queue received messages to this VG/AS. If the action is Stop flow control, the SS7 GW will un-queue messages queued for this VG/AS, and once all queued messages have been sent, continue passing received messages to the VG/AS According to one embodiment, a set of encapsulated ISUP messaging function are provided which define sequences between the PSTN 12, and specifically the ISUP gateway 16 within the PSTN 12, and an element in the VG/AS array 30. The following procedures define a set of sequences for both single circuit and group messages according to one embodiment:

Single Circuit Messages
PSTN to VG/AS

When a message is received from PSTN 12, the DPC, OPC, NI and CIC are used to determine which VG/AS to which the message is sent. If a VG/AS is found, the message is sent to the found VG/AS.

If no VG/AS is found, then a UCIC is sent to PSTN 12 unless the message was one of UCIC, CVT, CVR, CQM or CQR. UCIC, CVR and CQR are discarded with no further action. If the message was CVT then a CVR is returned with the Circuit Validation Response Indicator Set to "failed," and the circuit group characteristics indicator set to all zeroes, and no optional parameters (a zero pointer to optional parameters).

If the message was CQM then each of the indicated CIC's are checked, if all CIC's are unequipped the CQR message is returned indicating that all circuits are unequipped. If equipped circuits are found, then separate CQM's are sent to each VG/AS. The SS7 GW will wait for replies (CQRs) and reassemble the reply to the PSTN 12 once all replies have been received. The SS7 GW will keep information regarding the replies expected. If not all replies have been received with X seconds, no reply will be sent to PSTN 12. If the SS7 GW has control over circuits, the reply will be handled by the SS7 GW with the Circuit State indicator set according to the status information.

VG/AS to PSTN

When a message from VG/As is received, the Handle and the CIC is used to fine the mapping information (the OPC, DPC, SLS and NI to use, for example). If no mapping data is found the message is discarded. If the data is found, the message is sent to the PSTN 12 using the data in the table and received in the message.

Group Messages

PSTN to VG/AS

For group messages, the SS7 GW will examine the Range and Status parameter of the message. If all circuits belongs to the same VG/AS, then the message is treated the same as a single circuit message.

If the Range spans more than one VG/AS, then the SS7 GW will split the group message into parts, one for each VG/AS. Each VG/AS will be treated sequentially, i.e., one VG at a time will be handled. Once all VG's/AS's have been treated, the reply will be sent to PSTN 12. If the message has not been reassembled within X seconds, processing will stop. For applications using double group blocking and reset messages (e.g., ANSI), the SS7 GW will act on the messages independently.

If any of the circuits are unequipped, then the unequipped circuit(s) will be included in the group message where the closest equipped circuit number is sent.

VG/AS to PSTN

The same procedure as for single messages can be used.

Next, the thin ISUP layer 100 also includes a connection supervision module which is used to maintain the connections between any two elements in the network and provides for circuit maintenance, control and connection reestablishment. According to one embodiment the connection supervision module includes the following functions:

Connection Supervision

HeartBeat supervision

If the HeartBeat is stopped from the VG/AS, the following maintenance actions are initiated in the SS7 GW.

If the circuit status is unknown; The SS7 GW will send blocking messages (BLO/CGB) for the circuits that are defined for the VG/AS. Different actions may be needed depending on the protocol variant used. This is controlled in the SS7 GW, e.g., some variant may require that group blocking with immediate release be used, where another requires group blocking with immediate release (also known as HW blocking and Maintenance blocking, respectively.).

If the circuit status is Un-blocked; The SS7 GW will send blocking messages (BLO/CGB) for the circuits that are defined for the VG/AS.

If the circuit status is blocked, no actions are taken by the SS7 GW.

If the HeartBeat is stopped from the SS7 GW, the thin ISUP layer 100 in the VG/AS will act as if the MTP PAUSE primitive was received.

Loss of TCP/IP Connection

If the TCP/IP connection is broken, the same actions as for loss of heartbeat will be taken.

Connection Re-establishment when the connection is re-established, SS7 GW will send the MTP-primitive that reflects the current status of the MTP, e.g., MTP-RESUME is the status of the MTP is 'normal'.

In one embodiment, the VG/AS can resume control of the circuits and read the status of the circuits from the SS7 GW using Control_Resume_Req/Ack. After the VG/AS has received information that the MTP is accessible (e.g., MTP-RESUME) it can start treating the circuits it has resumed control over:

If the status is Blocked, the VG/AS will un-block the circuits.

If the status in Unknown, the VG/AS will reset the circuits.

If the status is Un-blocked, the VG/AS will resume normal call processing of stable calls.

After the VG/AS has resumed control of the circuits, the SS7 GW will mark the status (local and remote) as unknown.

SS7 GW Control of Circuits

When the SS7 GW is in control of the circuits, it will maintain the remote blocking status of the circuits, i.e., terminate blocking, un-blocking and reset messages, and respond to them. If an RSC is received, the SS7 GW will respond with RLC and BLO, and mark the far end status as un-blocked. If a GRS is received, the SS7 GW will respond with a GRA indicating that the circuits are blocked. If a BLO/CGB is received, the SS7 GW will respond with a GRA indicating that the circuits are blocked. If a BLO/CGB is received, the SS7 GW will mark the circuits remotely blocked and respond with BLA/CGA. If a UBL/CGU is received, the SS7 GW will mark the circuit(s) remotely unblocked and respond with UBA/CGUA.

The SS7 GW will also respond to CQM messages. If a CQM is received it will respond with the circuit state Indicator as specified in Table 1:

TABLE 1

Circuit State Indicator Handling

| Local state | Remote State | Circuit State Indicator |
| --- | --- | --- |
| Unknown | Unknown | Idle |
| Unknown | Blocked | Idle, remotely blocked |
| Blocked | Unknown | Idle, locally blocked |
| Unblocked | Unblocked | Idle |
| Unblocked | Blocked | Idle, remotely blocked |
| Blocked | Unblocked | Idle, locally blocked |
| Blocked | Blocked | Idle, locally and remotely blocked |

Figure 5:
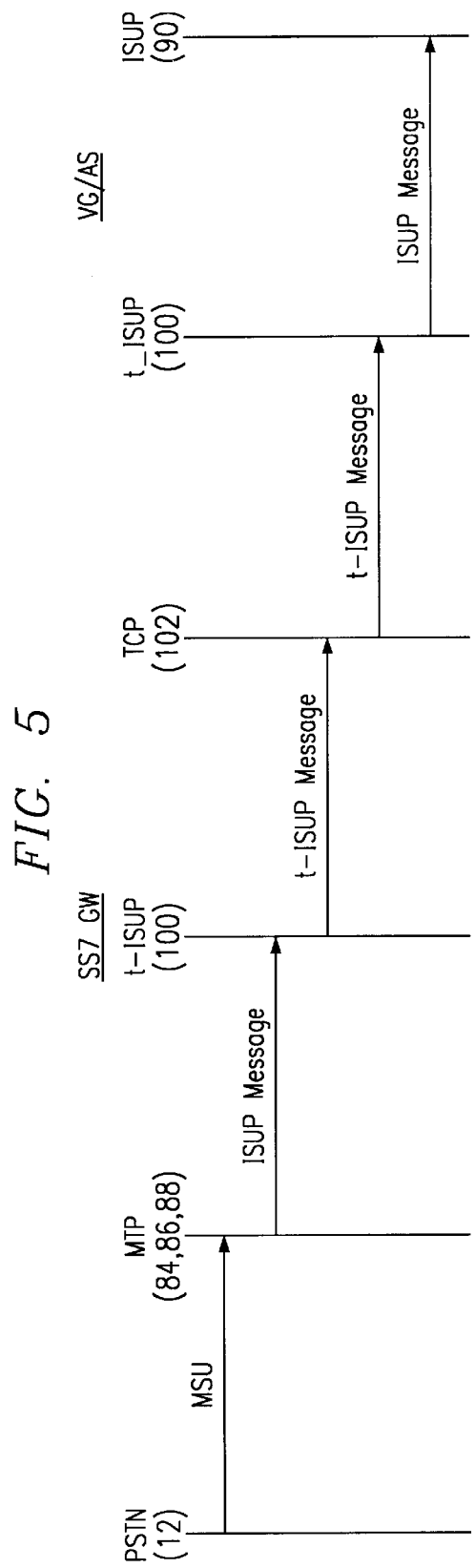

Through the enumerated operations/management, messaging functions and connection supervision modules and the corresponding sequences, the present invention through the thin ISUP layer 100 provides a mechanism for distributing multiple end-to-end call routing functions among multiple processors in an SS7 network 50. FIGS. 5–12 illustrate example messaging sequences which can occur in an SS7 GW internetworking function according to possible uses and applications of the invention in SS7 network. For example, FIG. 5 illustrates a sequence for receiving a message from the PSTN 12. A message originating in the PSTN 12 is transmitted to the MTP layer (84, 86, 88) in the SS7 GW.

Messages are then transmitted to the thin ISUP layer 100 in the SS7 GW and to the VG/AS array 30 via the TCP connection 102. Next, the message arrives at the thin ISUP 100 portion contained in the VG/AS and finally to the ISUP layer 90 also contained therein. The reverse messaging function from (VG/AS array 30 to PSTN 12) is illustrated in FIG. 6 which follows the sequence of a message originating in the VG/AS array 30 and transmitted to the PSTN 12.

A sequence for receiving an MTP primitive message from the PSTN 12 is shown in FIG. 7.

Figure 8:
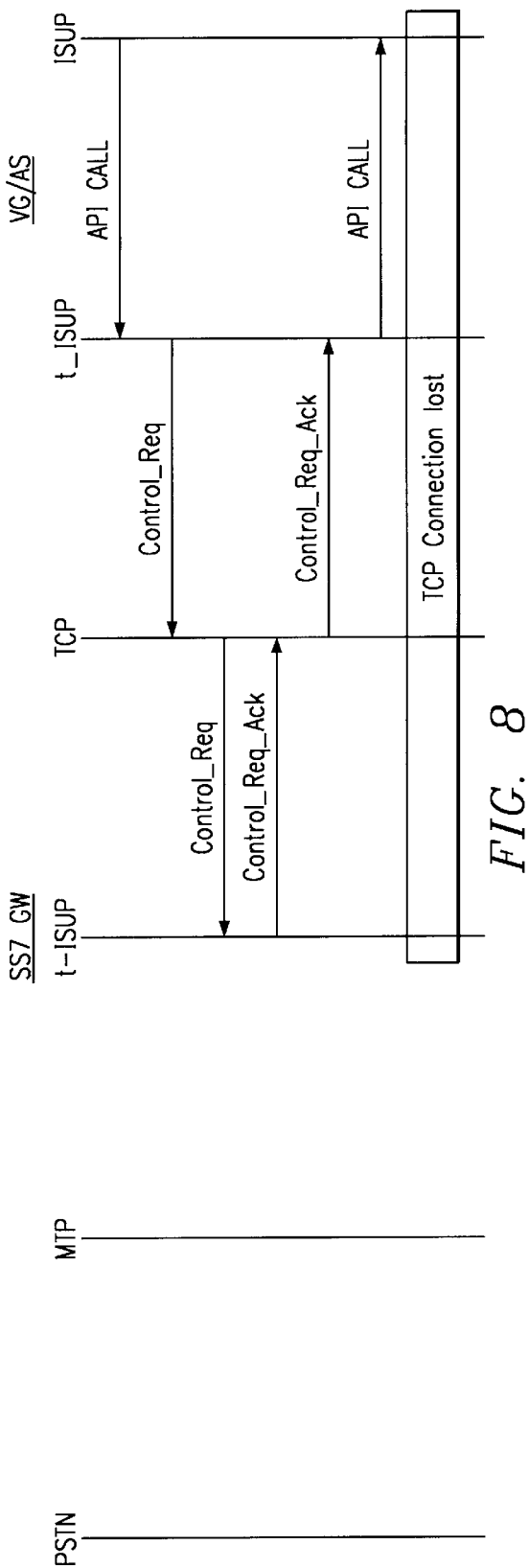

FIG. 8 shows a sequence for a controlled VG/AS shut down process wherein the VG/AS hands over control of circuit to indicate a locally blocked state. In such an action the SS7 GW takes no action towards the PSTN 12. The sequencing process terminates when the TCP/IP 102 connection is lost as indicated in FIG. 8.

Figure 9:
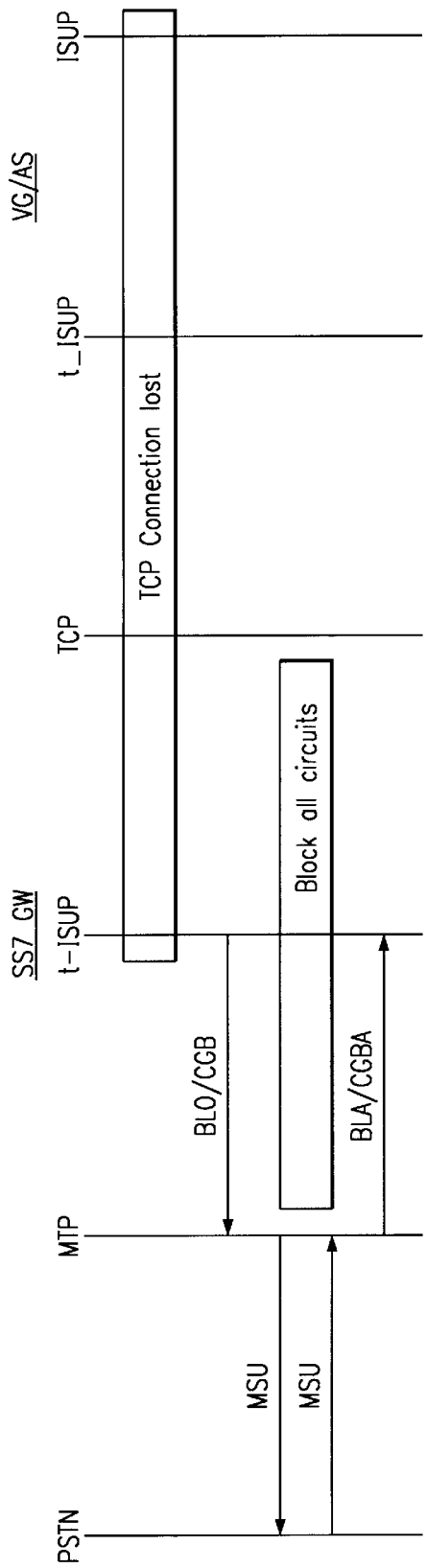

The sequence for an uncontrolled VG/AS shut-down is initiated when the TCP/IP connection 102 is lost without the VG/AS handing over control of the circuits. During uncontrolled shut down, the SS7 GW blocks all circuits connected to the VG/AS as shown in FIG. 9.

Figure 10:
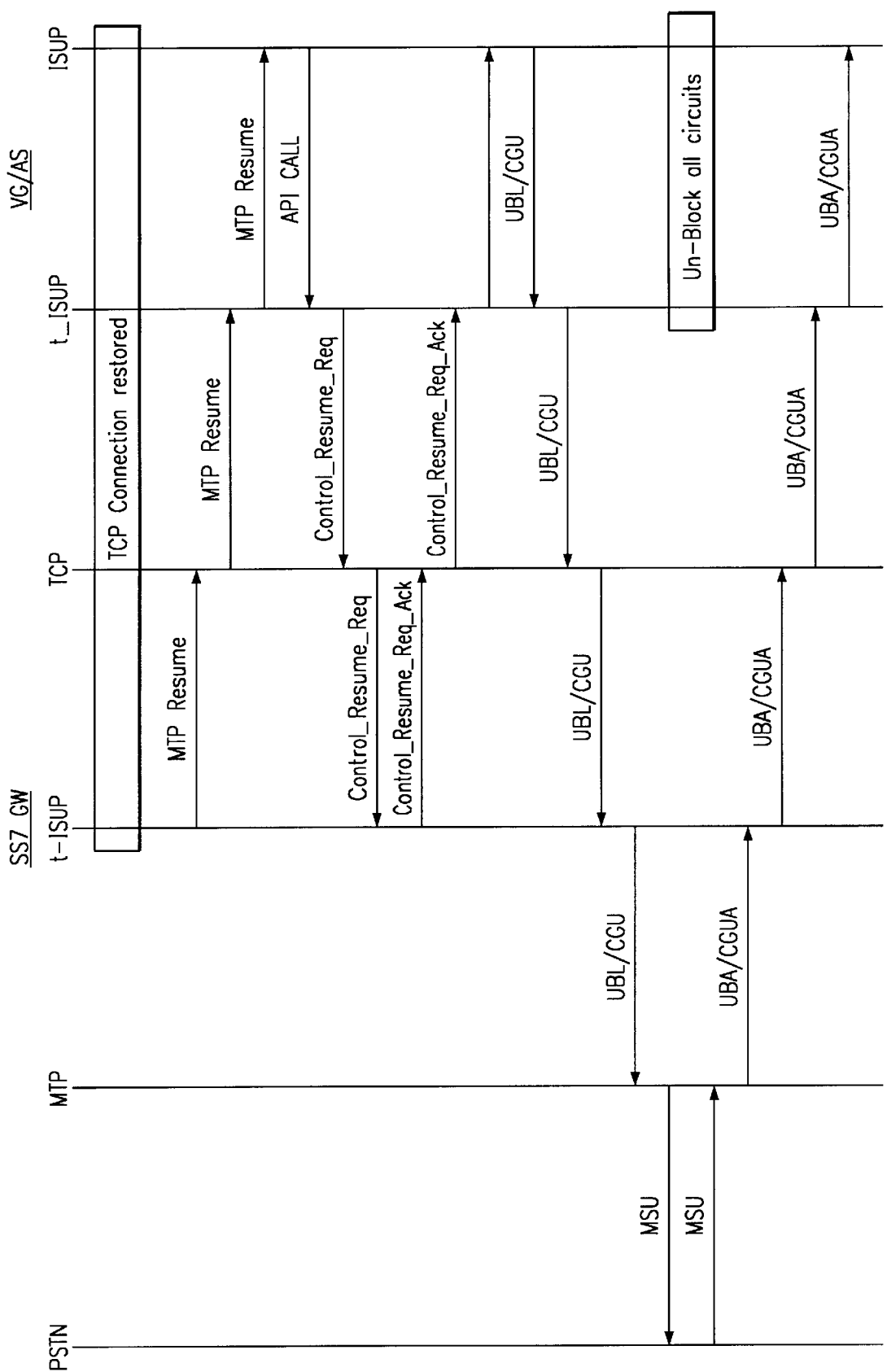

FIG. 10 illustrates a controlled VG/AS turnup with circuit unblocking wherein an element in the VGIAS array 30 requests control of all circuits while the SS7 GW indicates a locally blocked state. The end result is that an element of the VG/AS array 30 unblocks all circuits in a controlled manner.

Figure 11:
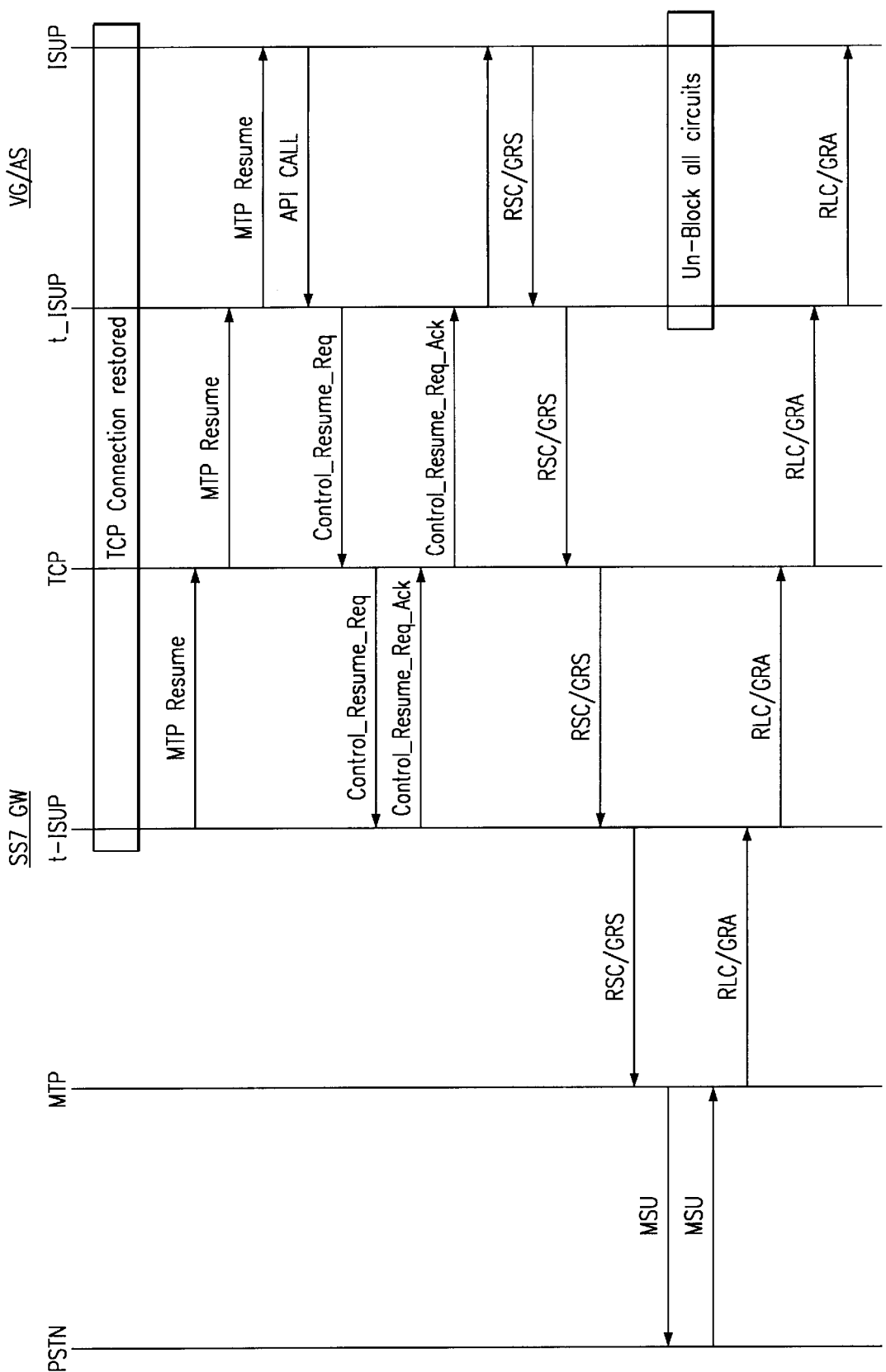

The sequence for a controlled VG/AS turnup with a circuit reset is illustrated in FIG. 11. Initially, the TCP/IP connection 102 is restored making the status of the MTP layer (84, 86, 88) accessible. An element of the VG/AS array 30 requests control of all circuits while the SS7 GW indicates a locally blocked state. The turnup sequence terminates when the element unblocks all circuits.

Figure 12:
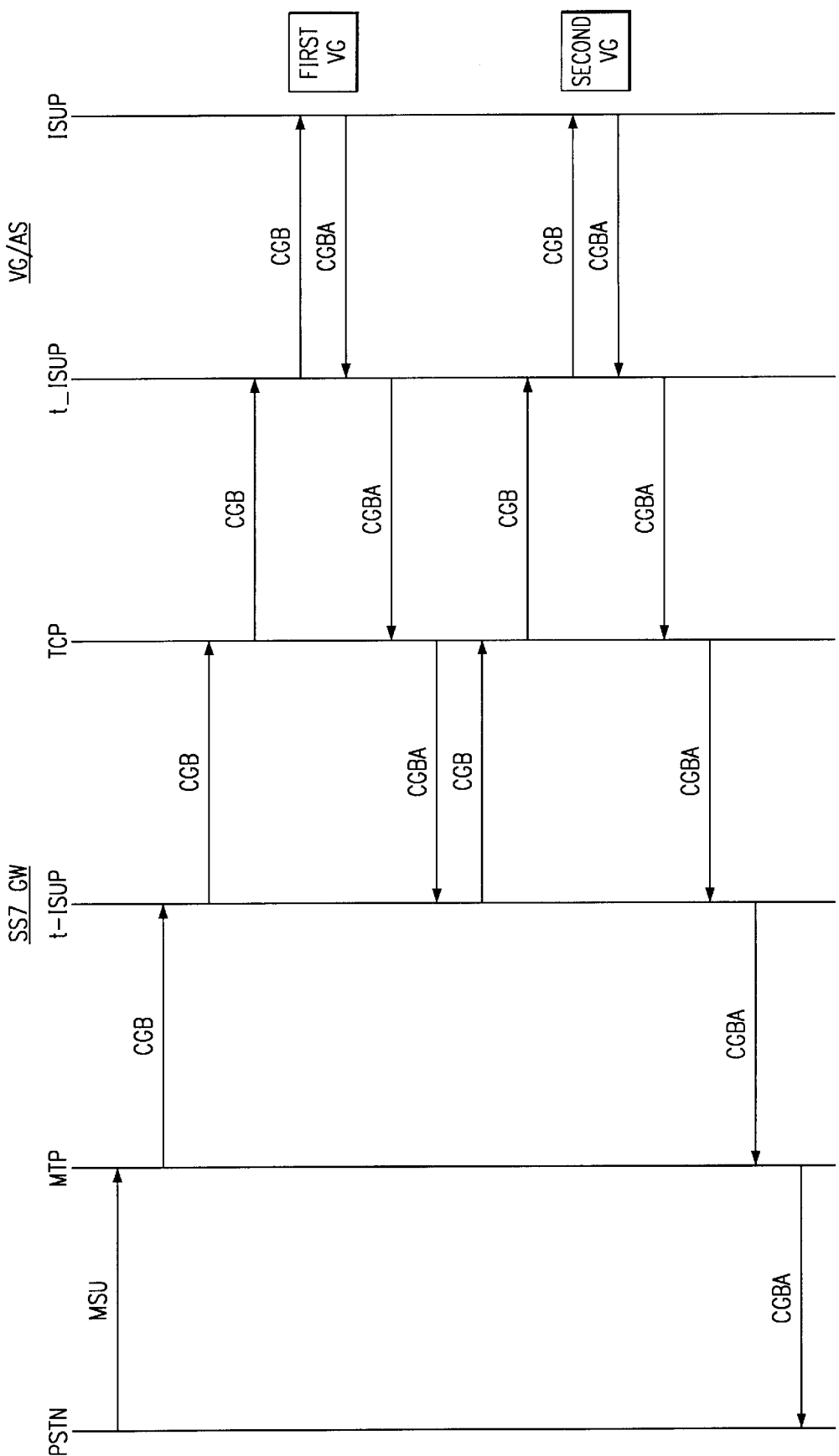

A sequence for transmitting a group message to multiple voice gateways is shown in FIG. 12. In particular, first and second gateway nodes are able to receive a circuit group blocking message.

While the invention has been described and shown with reference to preferred embodiments it should be understood by those skilled in the art that various other changes in the form and details may be made without departing from the spirit and scope of the invention.

What is claimed is:

1. In a common channel signaling system, a mechanism for distributing end-to-end call routing functions among multiple processors comprising:
   an array of loosely coupled processors that communicate with each other over signaling links supporting signaling system number 7 (SS7) using an Internet Protocol (IP); and
   a task distribution module comprising a layer between the MTP layer and the ISUP layer of said SS7 signaling links, said layer operably coupled to said array and configured to administer a plurality of operations/management functions over any one or a set of said array of loosely coupled processors.

2. The mechanism according to claim 1 wherein:
   some of said processors are functionally organized as an SS7 gateway (SS7-GW);
   some of said processors are functionally organized as an array of voice gateway access servers (VG/AS array) which communicates with said SS7-GW through a TCP/IP connection; and
   wherein said layer permits said task distribution module to route message sequences from said SS7 GW to said VG/AS array through said TCP/IP connection.

3. The mechanism according to claim 2 further comprising:
   a public switched telephone network (PSTN) coupled to said SS7-GW through one or more SS7 signaling links; and
   a plurality of speech connections extending from said PSTN to said VG/AS so that speech data from said PSTN can reach said VG/AS array.

4. In an Internet Protocol (IP) telephony signaling network utilizing common channel signaling system number 7 (SS7), a mechanism for internetworking an SS7 Gateway and distributed ISDN User Parts (ISUPs) residing on separate processors comprising:
   an operations/management module that controls circuit signaling functions between said SS7 gateway and said distributed ISUPs;
   a plurality of ISUP messaging functions that control the format of both single circuit and group messages distributed between said separate processors;
   a connection supervision module that maintains connections between any of said separate processors; and
   wherein said operations/management module, plurality of ISUP messaging functions and connection supervision module form a protocol stack layer interspersed between the Message Transfer Part (MTP) layer and the ISUP layer implemented on said distributed processors.

5. The mechanism according to claim 4 further comprising a public switched telephone network communicably coupled to said SS7 gateway through an SS7 signaling link.

6. The mechanism according to claim 5 wherein some of said ISUPs constitute voice gateways communicably coupled to said SS7 gateway through TCP/IP connections.

7. The mechanism according to claim 6 wherein said voice gateways are communicably coupled to said PSTN through speech connection channels.

8. The mechanism according to claim 4 wherein said operations/management module includes a heartbeat sequence for determining when an entity on the network is alive.

9. The mechanism according to claim 4 wherein said operations/management module includes a circuit control sequence that can initiate and update the status of connection on the network.

10. The mechanism according to claim 4 wherein said operations/management module includes a set of MTP primitives used to distribute messages to a processor via the SS7 Gateway.

11. The mechanism according to claim 4 wherein said plurality of ISUP messaging functions direct a message to a single processor via the SS7 Gateway.

12. The mechanism according to claim 4 wherein said plurality of ISUP messaging functions direct a message to a group of processors via the SS7 Gateway.

13. The mechanism according to claim 4 wherein said connection supervision module can generate a heartbeat supervision sequence to determine the status of a circuit.

14. The mechanism according to claim 4 wherein said connection supervision module can generate a heartbeat supervision sequence to determine whether a processor or connection in the network is up or not.

15. The mechanism according to claim 6 wherein said connection supervision module determines when said TCP/IP connection is broken.

16. The mechanism according to claim 4 wherein said connection supervision module can re-establish a connection between any of said processors.

17. A method of distributing an ISDN user part (ISUP) over multiple loosely coupled processors of an SS7 network comprising the steps of:

implementing a thin ISUP layer in between the Message Transfer Part (MTP) layer and ISUP layer of an SS7 protocol stack; and distributing messages from a first SS7 node to a second SS7 node of said SS7 network through said thin ISUP layer.

18. The method according to claim 17 wherein the step of distributing messages is performed by distributing a message from a first SS7 node in the network to the thin ISUP layer.

19. The method according to claim 18 further comprising the step of distributing the message from the thin ISUP layer to a second node in the network.

20. The method according to claim 19 wherein the step of distributing the message to the second node is performed over a static connection coupling said first and second nodes.

21. The method according to claim 17 wherein the step of distributing messages occurs through the transmission of MTP primitive messages.

22. The method according to claim 17 preceded by the step of determining is any of the circuit connections in the network are broken.

23. The method according to claim 22 further comprising the step of blocking all circuit connections when a circuit connection is broken.

24. The method according to claim 23 further comprising the step of re-establishing a connection that is found to be broken.

\* \* \* \* \*